(12) United States Patent
Sanchez

(10) Patent No.: US 7,874,227 B2
(45) Date of Patent: Jan. 25, 2011

(54) TELEOPERABLE ELECTROMECHANICAL DEVICE

(76) Inventor: Daniel Steven Sanchez, P.O. Box 14, Summerland, CA (US) 93067

( * ) Notice: Subject to any disclaimer, the term of this patent is extended or adjusted under 35 U.S.C. 154(b) by 638 days.

(21) Appl. No.: 11/749,716

(22) Filed: May 16, 2007

(65) Prior Publication Data

US 2008/0282831 A1    Nov. 20, 2008

(51) Int. Cl.
*B25J 17/00*    (2006.01)
(52) U.S. Cl. ............... 74/490.03; 74/490.01; 901/6; 901/9
(58) Field of Classification Search ........... 74/10 R, 74/490.01, 490.02, 490.03, 490.04; 901/2, 901/3, 6, 9
See application file for complete search history.

(56) References Cited

U.S. PATENT DOCUMENTS

| | | | |
|---|---|---|---|
| 6,714,841 B1* | 3/2004 | Wright et al. | 700/259 |
| 2005/0183532 A1* | 8/2005 | Najafi et al. | 74/490.01 |

* cited by examiner

*Primary Examiner*—David M Fenstermacher

(57) ABSTRACT

The user's movement of the joints on a master mechanism is converted to electrical energy to control a kinematically similar arrangement of joints on a slave mechanism. Bi-directional, dynamic, force reflecting control of the slave mechanism is provided without a need for sensors, software, computers, or external power sources.

2 Claims, 2 Drawing Sheets

TELEOPERABLE ELECTROMECHANICAL DEVICE

BACKGROUND OF THE INVENTION

1. Field of the Invention

The present invention relates to teleoperable devices. Even more particularly, the present invention relates to tethered teleoperable devices.

2. Prior Art

Various teleoperable devices have been taught for use in the robotics industry. These include applications in the entertainment, industrial, military, and medical industries. These devices typically include a master device electrically connected to a slave device through a computer system employing an active control scheme to coordinate motion between the master mechanism and the slave mechanism. These devices tend to be complex in both software and hardware and are extremely expensive.

The present invention enables the creation of extremely capable teleoperable devices of minimum cost and complexity that can be stably controlled without a computer, power electronics, or sensor feedback. The user's motions of the actuators at a master mechanism generate the power and directionality required to respectively control the joints of the slave mechanism.

SUMMARY

A preferred embodiment of a teleoperable mechanical device comprises: (a) an actuator on a master mechanism; (b) an actuator on a slave mechanism; (c) direct electrical connection between respective wire leads of both master and slave actuators; (d) said master mechanism directly coupled to the motions of the user, said motions generating electrical energy to drive the slave mechanism.

Suitable actuators may include brush motors, brushless motors, stepper motors, and solenoids. These actuators may include transmission elements to provide suitable reduction ratios for desirable motion performance between master and slave mechanisms.

The present invention allows for bi-directional and dynamic control of the slave mechanism. Forces and torques can be accurately reflected between master and slave when high-efficiency back-driveable actuators are used for corresponding actuator pairs.

DESCRIPTION OF THE PREFERRED EMBODIMENTS

Figure 1:
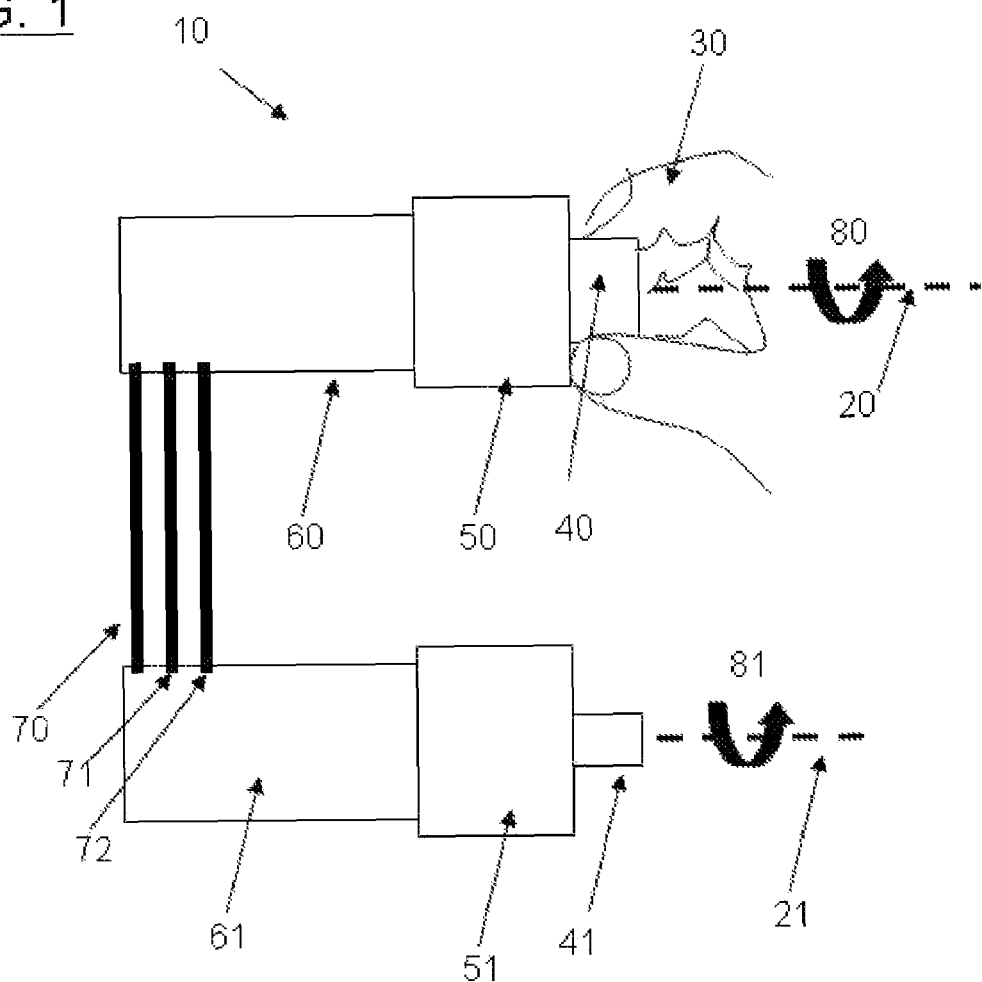
FIG. 1 shows the simplest implementation of the invention in which two actuators are electrically connected in parallel.

Referring to FIG. 1, a teleoperable device 10 in accordance with the present invention comprises two brushless motors 60 and 61 connected to each other directly through their lead wires 70, 71, and 72. Motor 60 is the master actuator. Motion of the user's hand 30 moves input knob 40 through a path 80 about axis 20. A gearhead 50, intermediate knob 40 and motor 60, amplifies the rotation imparted to the input knob 40 to mechanically drive motor 60. The electrical energy generated by motor 60 is transmitted through the wires 70, 71, 72 to electrically drive motor 61. A gearhead 51 is intermediate the motor 61 and the output shaft 41. Output shaft 41 moves about axis 21 with a path 81 that is proportional to the user's input path 80.

Figure 2:
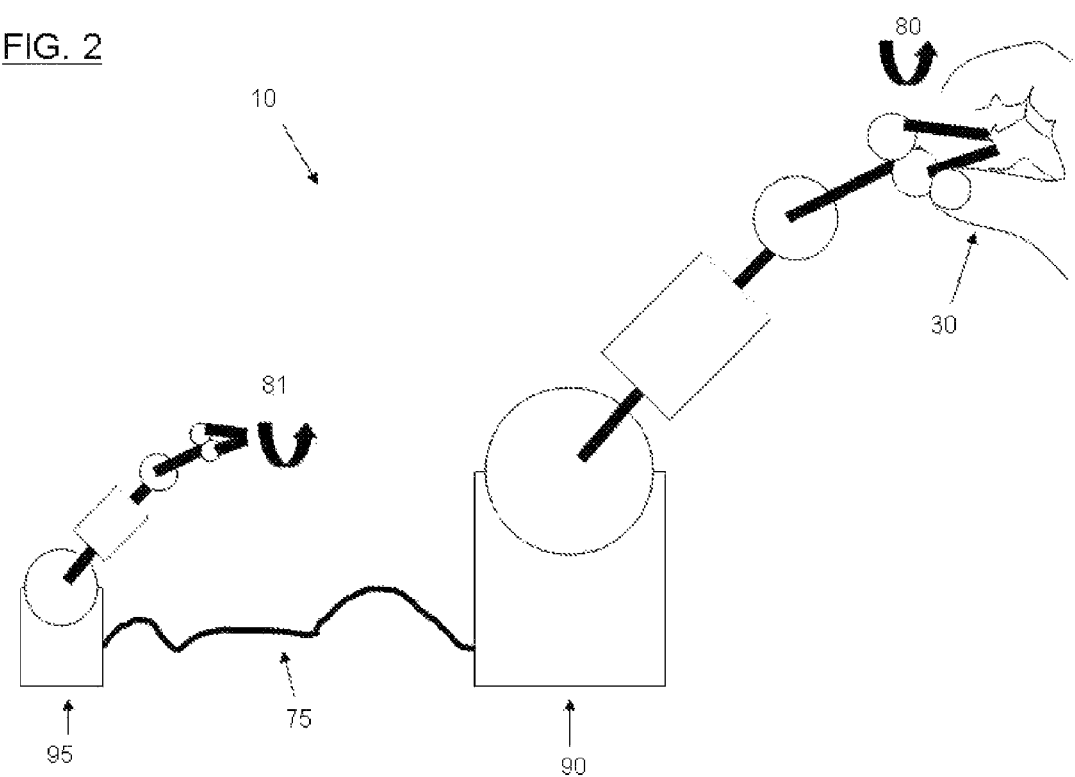
FIG. 2 shows a multi-axis teleoperative mechanism according to the present invention.

Referring to FIG. 2, a multi-degree of freedom master mechanism 90 is electrically connected to a kinematically similar slave mechanism 95 with wire bundle 75. The actuator for a specific joint on the master mechanism 90 is wired as shown in FIG. 1 to its corresponding actuator axis on the slave mechanism. The path 81 of a user's hand 30 is converted to electrical energy by the master mechanism 90 to drive the actuators on the slave mechanism 95. The resultant output path 81 is proportional to the user's input path 80.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What I claim is:

1. A manually powered teleoperable electromechanical device comprising: (a) an electromagnetic generator on a master mechanism, said generator coupled to the motions of a user, said motions converted by said generator into electrical energy; (b) an electromagnetic actuator on a slave mechanism, said actuator sized appropriately to drive and power said slave mechanism using levels of electrical energy generated by said generator; (c) a non-amplifying direct conduction path for said electrical energy between said generator on said master mechanism and said actuator on said slave mechanism.

2. The invention of claim 1, where the teleoperable device consists of a plurality of electrically connected generators and actuators.